United States Patent
Ueda et al.

(10) Patent No.: US 9,929,822 B2
(45) Date of Patent: Mar. 27, 2018

(54) ELECTRIC FADER DRIVE UNIT, FADER DEVICE, AUDIO MIXER, AND ELECTRIC FADER DRIVING METHOD

(71) Applicant: Yamaha Corporation, Hamamatsu-shi, Shizuoka-ken (JP)

(72) Inventors: Taku Ueda, Toyohashi (JP); Satoshi Takemura, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 0 days.

(21) Appl. No.: 15/223,379

(22) Filed: Jul. 29, 2016

(65) Prior Publication Data

US 2017/0041091 A1    Feb. 9, 2017

(30) Foreign Application Priority Data

Aug. 7, 2015  (JP) ................................. 2015-157115
Aug. 7, 2015  (JP) ................................. 2015-157116

(51) Int. Cl.
*H04B 1/00* (2006.01)
*H04H 60/04* (2008.01)
*H05B 37/02* (2006.01)

(52) U.S. Cl.
CPC ......... *H04H 60/04* (2013.01); *H05B 37/0227* (2013.01); *Y02B 60/50* (2013.01)

(58) Field of Classification Search
CPC   H04H 60/04; H05B 37/0227; F21V 33/0056; F21W 2131/406; G11B 27/34; G11B 27/028; G11B 27/034; G11B 27/038; Y02B 60/50
USPC ........................................................ 381/119
See application file for complete search history.

(56) References Cited

U.S. PATENT DOCUMENTS 5,122,720 A *  6/1992  Martinson .............. H04H 60/04
                                                    318/624
6,153,994 A * 11/2000  Royer ................... H05B 37/029
                                                    318/466

FOREIGN PATENT DOCUMENTS

GB    2 263 049 A     7/1993
JP    2684808 B2     12/1997
JP    3775368 B2      5/2006

OTHER PUBLICATIONS

Extended European Search Report issued in counterpart European Application No. 16182590.6 dated Jan. 2, 2017 (eight (8) pages).

* cited by examiner

*Primary Examiner* — Matthew Eason
*Assistant Examiner* — Sabrina Diaz
(74) *Attorney, Agent, or Firm* — Crowell & Moring LLP

(57) ABSTRACT

An electric fader drive unit includes a drive portion, a fader position control portion, and an electric fader control portion. The drive portion drives an electric fader by supplying drive power to the electric fader. The fader position control portion indicates a target position of the electric fader. The electric fader control portion receives an indication of the target position from the fader position control portion, and, when controlling the drive portion to move the electric fader to the target position, moves the electric fader to the target position by changing the drive power maintained at preparation drive power less than the minimum drive power that is the lowest drive power required for moving the electric fader to a predetermined drive power not less than the minimum drive power.

13 Claims, 6 Drawing Sheets

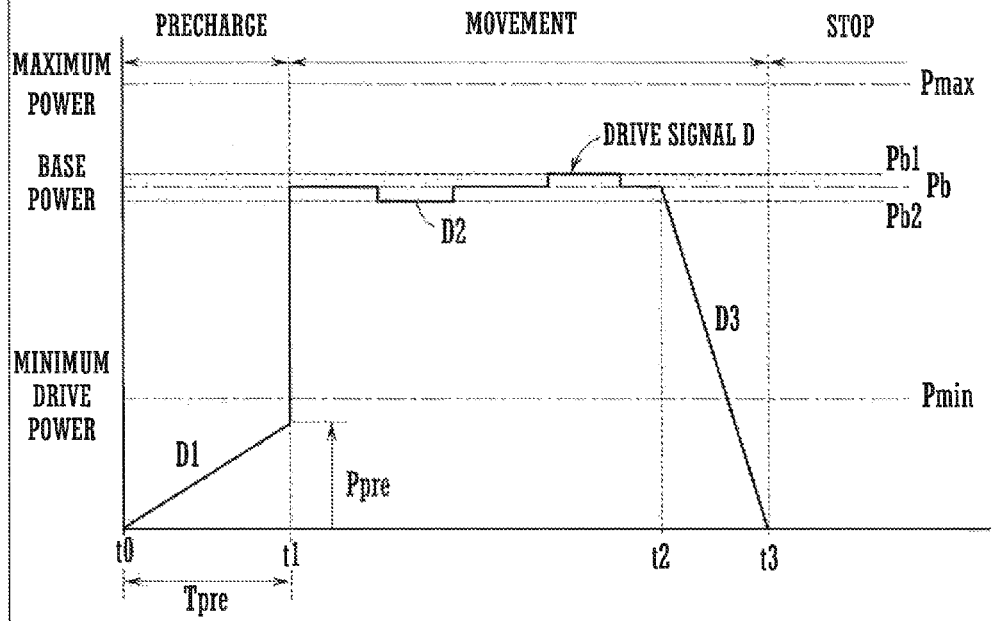
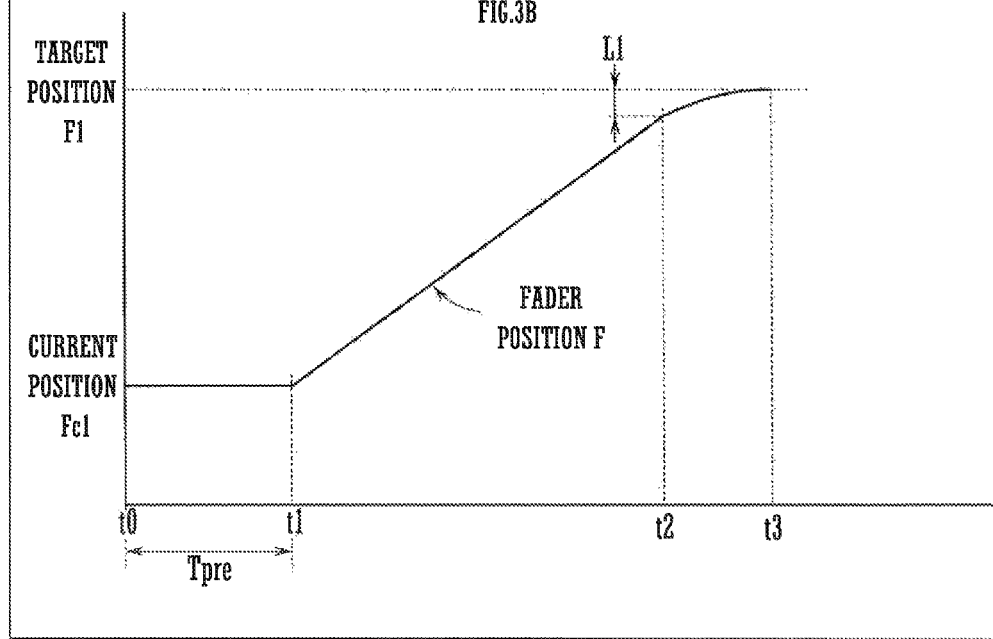

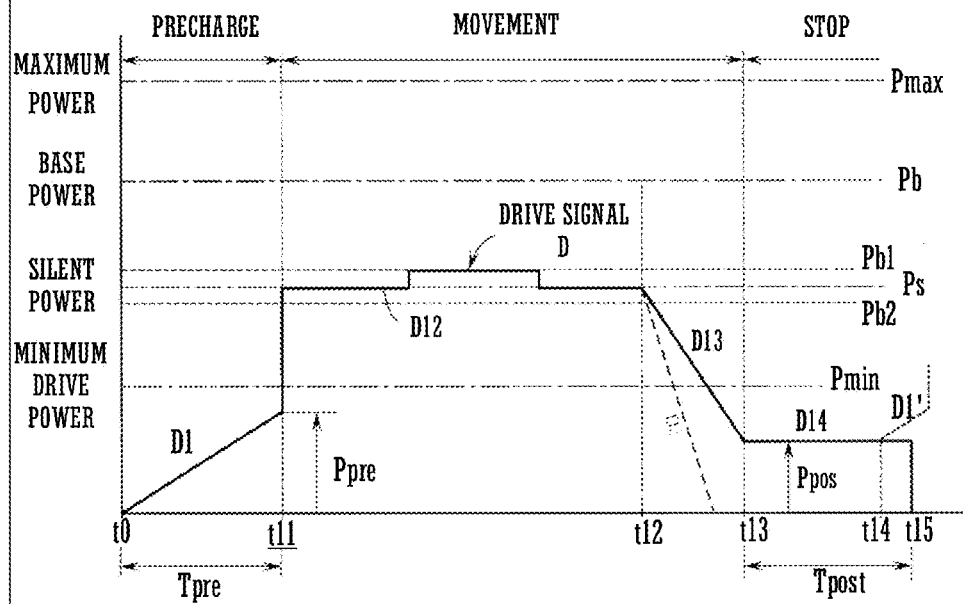
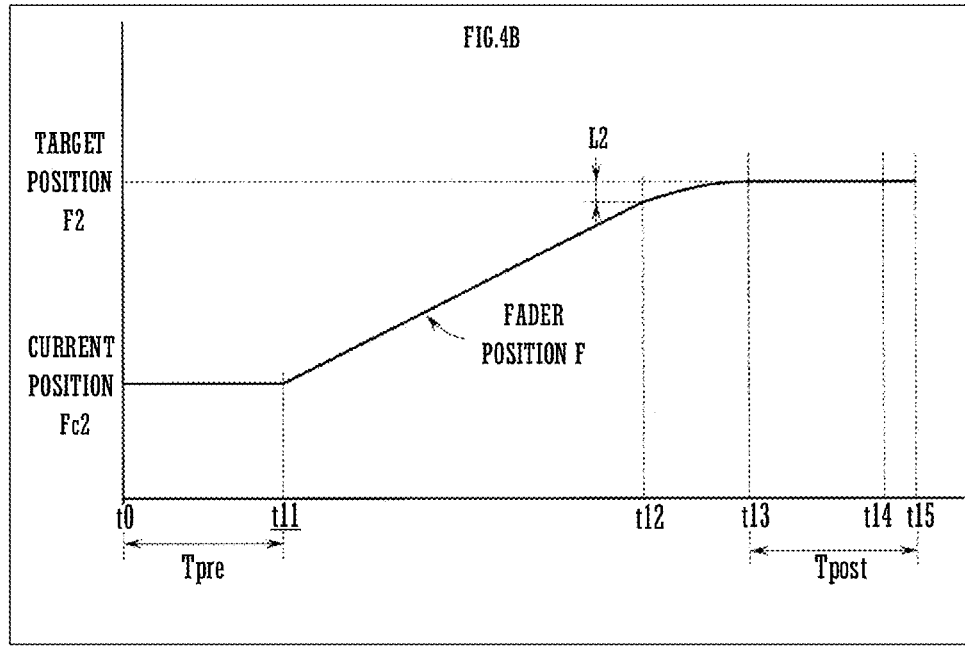

ELECTRIC FADER DRIVE UNIT, FADER DEVICE, AUDIO MIXER, AND ELECTRIC FADER DRIVING METHOD

CROSS REFERENCE

This Nonprovisional application claims priority under 35 U.S.C. § 119(a) on Patent Applications Nos. 2015-157115 and 2015-157116, all filed in Japan on Aug. 7, 2015, the entire contents of which are hereby incorporated by reference.

BACKGROUND OF THE INVENTION

1. Field of the Invention

Some preferred embodiments of the present invention relate to an electric fader drive unit that drives an electric fader of a light dimmer, an audio mixer, or the like.

2. Description of the Related Art

A light dimmer used in a stage or a studio is capable of controlling the brightness of lighting by adjustment of the position of a fader of the light dimmer. Similarly, an audio mixer used in a stage or a studio is capable of adjusting volume, a tone, or the like, by adjustment of the position of a fader of the audio mixer.

Some light dimmers or some audio mixers include an electric fader. The electric fader includes a fader, a motor, and a belt that moves the fader. An electric fader drive unit, when receiving an indication of a target position, drives the electric fader and moves the fader to the target position.

The electric fader drive unit is capable of storing a fader position determined in the past and reproducing the brightness of the lighting determined in the past or the volume or the like determined in the past, by reading out a stored fader position as the target position.

The electric fader is required to move to the target position smoothly and accurately. In order to stop the electric fader at the target position smoothly and accurately, the speed of operation needs to be a comparatively low speed. In order to make the speed of operation into such a comparatively low speed, the electric fader needs to be driven with comparatively low drive power. However, the electric fader has an individual difference or a change over the years. Accordingly, when driven with low drive power, the electric fader may not obtain a sufficient drive power and may stop before reaching the target position. In order to prevent the influence of such an individual difference and a change over the years, it is necessary to set the drive power to be comparatively high. However, when driven with comparatively high drive power, the electric fader may stop at a position beyond the target position (overshoot may occur).

In view of the foregoing, an electric fader drive unit disclosed in Patent Literature 1 (Japanese Patent No. 2684808), for example, performs control of significantly reducing drive power if an electric fader in a current position approaches a target position. In addition, an electric fader drive unit disclosed in Patent Literature 2 (Japanese Patent No. 3775368) controls drive power so that the movement speed of a fader does not exceed a predetermined movement speed.

However, such conventional electric fader drive units have generated sound while driving the electric fader. Such sound is generated because a belt is bent, for example. The belt as a component of a drive system needs to be bent. If a large drive power is suddenly applied to the belt, the state of the belt is suddenly changed from a bent state to a tension applied state, which generates the sound.

The sound generated by the electric fader drive unit may become a noise that has a bad influence on the surrounding environment. For example, since the sound can be easily heard in a quiet studio, the sound generated by the electric fader drive unit is perceived as a noise.

SUMMARY OF THE INVENTION

In attempt to overcome such a problem, some preferred embodiments of the present invention are directed to provide an electric fader drive unit, an audio mixer, and an electric fader driving method that are capable of significantly reducing sound generated when an electric fader is driven.

Some preferred embodiments of the present invention include a drive portion, a fader position control portion, and an electric fader control portion. The drive portion drives an electric fader by supplying drive power to the electric fader. The fader position control portion indicates a target position of the electric fader. The electric fader control portion receives an indication of the target position from the fader position control portion and, when controlling the drive portion to move the electric fader to the target position, moves the electric fader to the target position by changing the drive power maintained at preparation drive power less than the minimum drive power that is the lowest drive power required for moving the electric fader to a predetermined drive power not less than the minimum drive power.

The electric fader drive unit is capable of significantly reducing sound generated when driving an electric fader.

The above and other elements, features, characteristics, and advantages of the present invention will become more apparent from the following detailed description of the preferred embodiments with reference to the attached drawings.

BRIEF DESCRIPTION OF THE DRAWINGS

FIG. 3A is a view showing a drive signal in a high speed movement mode.

FIG. 3B is a view showing a position of a fader in the high speed movement mode.

FIG. 4A is a view showing a drive signal in a silent movement mode.

FIG. 4B is a view showing a position of the fader in the silent movement mode.

DETAILED DESCRIPTION OF THE PREFERRED EMBODIMENTS

Figure 1:
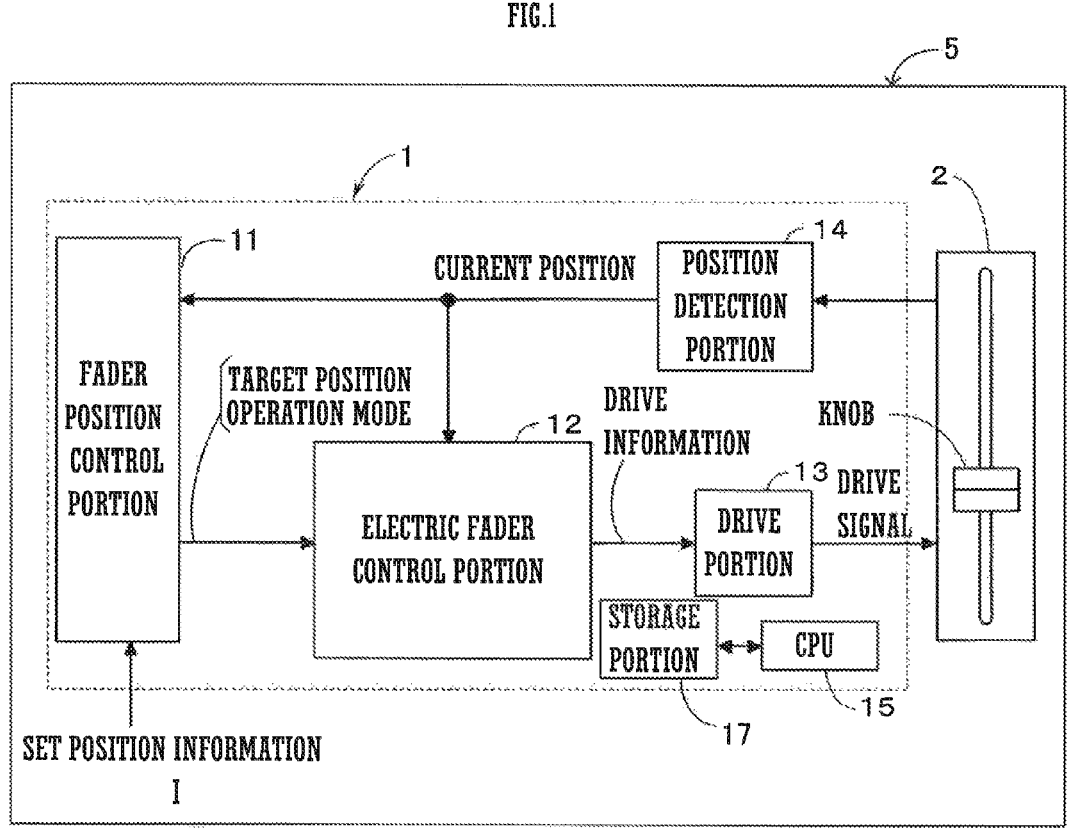
FIG. 1 is a functional block diagram showing a configuration of an electric fader drive unit.

FIG. 1 is a functional block diagram showing a configuration of an electric fader drive unit 1. The electric fader drive unit 1 performs control of moving a fader at a position in an electric fader 2 to a target position. The electric fader drive unit 1 and the electric fader 2 configure a fader device 5.

Figure 6A:
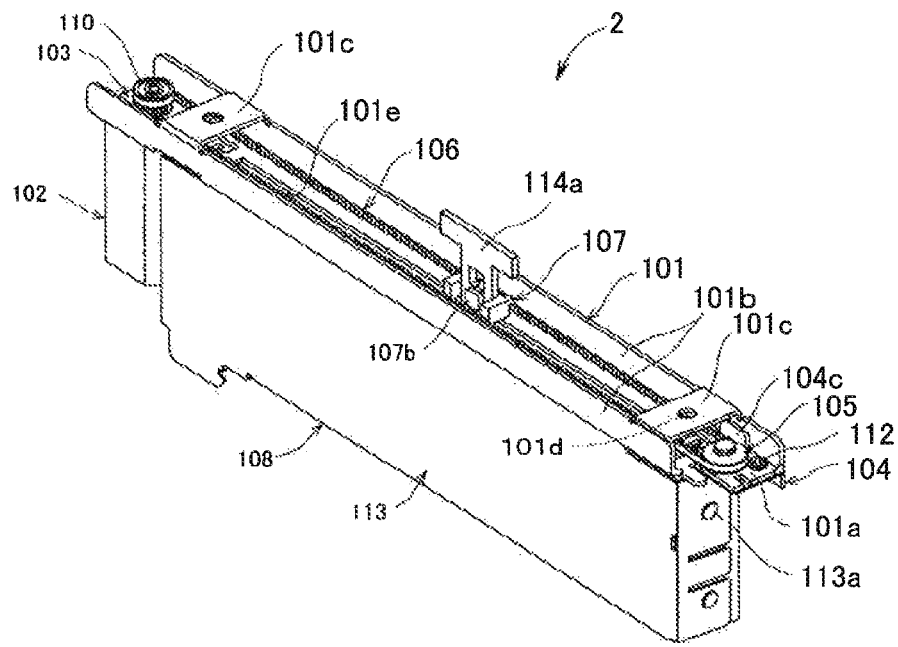
FIG. 6A is a perspective view showing an example of a configuration of an electric fader.
Figure 6B:
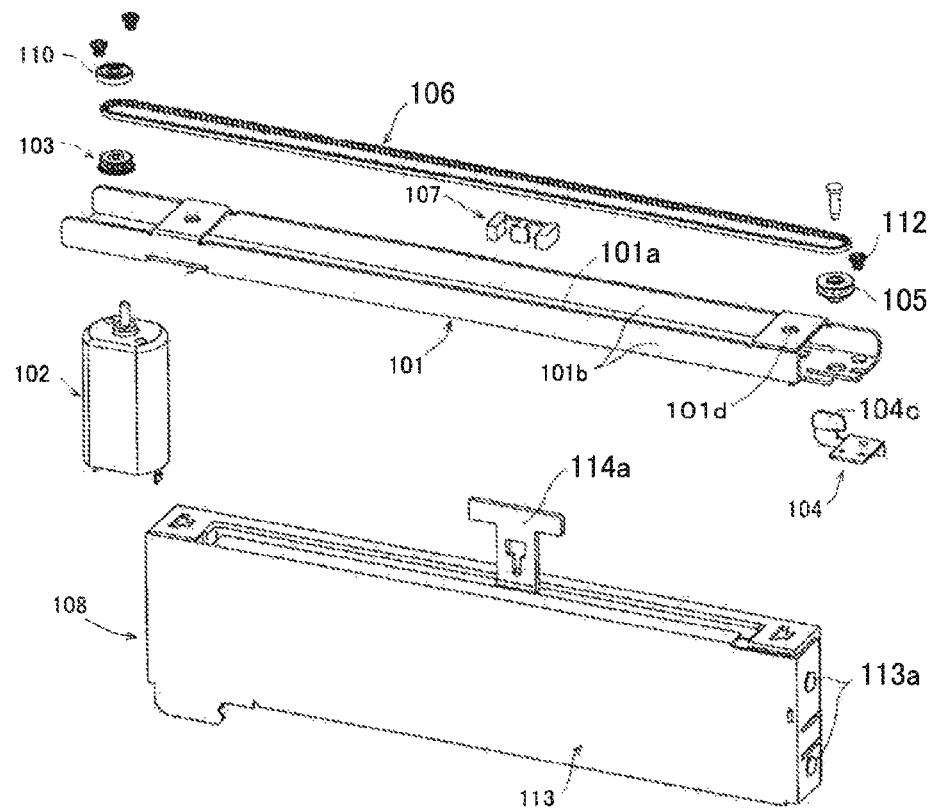
FIG. 6B is an exploded view showing an example of the configuration of the electric fader.

FIG. 6A is a perspective view showing an example of a configuration of the electric fader 2. FIG. 6B is an exploded view showing an example of the configuration of the electric fader 2.

The electric fader 2 mainly includes a frame body 101, a motor 102, a driving pulley 103, a movable member 104, a driven pulley 105, a belt 106, a fader 107, a variable resistor 108, and a spacer 110.

The frame body 101 is made of metal plates. The motor 102 is attached to the first end of the frame body 101. The driving pulley 103 and the spacer 110 are joined with a rotary shaft of the motor 102. The movable member 104 is arranged at the second end of the frame body 101. The driven pulley 105 is pivotally supported on the movable member 104. The belt 106 has an annular shape. The belt 106 is stretched between the driving pulley 103 and the driven pulley 105. The fader 107 is joined with the belt 106. As the motor 102 rotates, the belt 106 moves, so that the fader 107 moves in the longitudinal direction of the frame body 101. The variable resistor 108 adjusts a resistance value with the movement of the fader 107.

The frame body 101 is formed by punching and then bending a metal plate. The frame body 101 has a flat plate-like portion 101a in the center. The plate-like portion 101a has two side walls 101b that are perpendicular to the plate-like portion 101a and face each other, on a first side portion and a second side portion in the longitudinal direction. A bridge portion 101c is provided on the opposite sides of the upper face of the side walls 101b. The bridge portion 101c has a round hole 101d. The plate-like portion 101a includes, in the center, a substantially rectangular long window hole 101e in the longitudinal direction. The variable resistor 108 includes a lever 114a that is inserted into the long window hole 101e. This enables the lever 114a to move in the longitudinal direction. A guide portion 104c is pressed against the side walls 101b of the frame body 101 when a screw 112 is fastened. Accordingly, the movable member 104 may become difficult to move and is fixed to the frame body 101.

The lever 114a has a rectangle hole with which a rectangular lever supporting portion 107b protruded from the central part of the fader 107 is engaged. Accordingly, the fader 107 is connected with the lever 114a. The fader 107 and the lever 114a move together. It is to be noted that the frame body 101 and the variable resistor 108 are integrally engaged with each other. In addition, the lever 114a includes a not-shown knob fixed onto the upper part of the lever 114a. The knob, the fader 107, and the lever 114a configure a fader. If a user holds the knob and moves the lever 114a manually along the long window hole 101e, the resistance value of the variable resistor 108 is adjusted.

The variable resistor 108 includes a metal casing 113 and a shaft 113a. The metal casing 113 is formed into a box shape by bending a metal plate and the like. The shaft 113a is made of a pair of metal bars bridging in the longitudinal direction in the metal casing 113. The shaft 113a holds a belt-like resistor and a current collector that are not shown.

The electric fader drive unit 1 includes a fader position control portion 11, an electric fader control portion 12, a drive portion 13, a position detection portion 14, a CPU (Central Processing Unit) 15, and a storage portion 17.

The CPU 15 is a control portion that performs integrated control on the operation of the electric fader drive unit 1. The CPU 15 executes a predetermined program stored in the storage portion (storage medium) 17 such as a memory.

The electric fader 2 is included in a light dimmer, a digital mixer, or the like. The preferred embodiments described below shows a configuration in which a digital mixer includes the electric fader 2 and the electric fader drive unit 1. In such a case, the CPU 15 is mounted in the digital mixer. On the one hand, in a case in which the electric fader 2 is mounted in a light dimmer, the light dimmer is capable of adjusting the brightness of lighting. On the other hand, in a case in which the electric fader 2 is mounted in a digital mixer, the digital mixer is mainly capable of adjusting levels, performing equalizing, or imparting an effect.

The fader position control portion 11 indicates a target position of the fader 107 in the electric fader 2. Hereinafter, the position of the electric fader 2 means the position of the fader 107 in the electric fader 2. The operation of moving the electric fader 2 means the operation of moving the fader 107 in the electric fader 2.

It is to be noted that the fader position control portion 11, the electric fader control portion 12, and the drive portion 13 are hardware other than the CPU 15. However, the fader position control portion 11, the electric fader control portion 12, and the drive portion 13 may be software. The CPU 15 is capable of achieving by software a configuration of the fader position control portion 11, the electric fader control portion 12, and the drive portion 13 by executing a predetermined program.

A user, by holding a knob 2a included in the electric fader 2, can move the electric fader 2 to a target position. The user can also cause the storage portion 17 of the electric fader drive unit 1 to store the current position of the electric fader 2 as one scene. If the user gives an instruction of reading a scene stored in the past (scene recall), the fader position control portion 11 indicates the target position of the electric fader 2.

The scene stored in the storage portion 17 includes data (position data) that indicates the position of the electric fader. When the CPU 15 receives the instruction of reading a scene from the user, the CPU 15 reads the position data included in a specified scene, and inputs the position data into the fader position control portion 11 as target position data of the electric fader 2.

It is to be noted that the CPU 15 may indicate the movement speed of the electric fader 2. The fader position control portion 11, unless the maximum movement speed is indicated, sets a plurality of target positions before a final target position indicated in the target position data. The fader position control portion 11 outputs data that indicates a new target position to the electric fader control portion 12 whenever a predetermined time elapses. The predetermined time is controlled by the CPU 15. In a case in which the predetermined time is short, the movement speed of the electric fader 2 becomes fast, and in a case in which the predetermined time is long, the movement speed of the electric fader 2 becomes slow.

The electric fader control portion 12 generates drive information for causing the electric fader 2 to move to the target position inputted from the fader position control portion 11, and supplies the drive information to the drive portion 13. The drive portion 13 drives the electric fader 2 based on supplied drive information.

It is to be noted that the digital mixer includes a display device (not shown) that displays the screen of a user interface (UI) for setting the position of the fader. If a user operates the position of the fader on the UI screen displayed in the display device, setting position information I in response to the operation by the user is inputted to the fader position control portion 11. The fader position control portion 11 generates data that indicates a target position corresponding to inputted setting position information I, and outputs the data that indicates a target position to the electric fader control portion 12. Accordingly, the electric fader 2 is moved to the target position corresponding to the setting position information I. In other words, if the user specifies the position of the fader on the UI screen, the electric fader 2 moves to the specified position.

In addition, the digital mixer may store sequence data. The sequence data includes an event of a scene recall operation (or a fader operation event) and a time stamp that indicates the time when the event is generated.

When this sequence data is reproduced, the fader position control portion 11 generates data that indicates a target position corresponding to the fader operation event, and outputs the data to the electric fader control portion 12. Accordingly, whenever time reaches the time of a fader movement event indicated by the time stamp, the electric fader 2 is moved to a position corresponding to the fader movement event.

It is to be noted that, while FIG. 1 illustrates only one electric fader 2, in practice, a plurality of electric faders 2 are mounted in the digital mixer.

The fader position control portion 11 generates data that indicates a target position of the electric fader 2 and data that indicates an operation mode based on the control of the CPU 15. The generated data that indicates a target position and the generated data that indicates an operation mode are outputted to the electric fader control portion 12.

The operation mode includes a "high speed movement mode" in which the electric fader 2 is driven at a high speed and is moved to a target position, and a "silent movement mode" in which the electric fader 2 is driven silently and is moved to a target position. The data that indicates an operation mode includes information that specifies one of the operation modes.

The fader position control portion 11 changes the operation mode to be specified according to the difference (distance to move the electric fader) between the current position of the electric fader 2 and the target position. The current position of the electric fader 2 is notified from the position detection portion 14 to the fader position control portion 11.

The electric fader control portion 12, when receiving the data that indicates a target position and the data that indicates an operation mode from the fader position control portion 11, operates in the specified operation mode.

The electric fader control portion 12 calculates the remaining distance that is a difference between the current position of the electric fader 2 detected by the position detection portion 14 and the supplied target position. Then, the electric fader control portion 12 generates drive information corresponding to the calculated difference and the set operation mode. The electric fader control portion 12 outputs the generated drive information to the drive portion 13.

The drive portion 13 generates a drive signal according to the inputted drive information. The drive portion 13 applies the generated drive signal to the electric fader 2 and drives the motor 102. As the motor 102 of the electric fader 2 is driven, the knob 2a is moved toward the target position. The current position of the electric fader 2 during movement is detected by the position detection portion 14, and is fed back to the electric fader control portion 12. The electric fader control portion 12, the drive portion 13, the electric fader 2, and the position detection portion 14 configure a feedback loop. The electric fader control portion 12, the drive portion 13, the electric fader 2, and the position detection portion 14, by the feedback loop, perform servo control so that the remaining distance may become zero. Accordingly, the electric fader 2 is moved to the target position.

When the fader position control portion 11, when generating a target position, sends data that indicates the high speed movement mode to the electric fader control portion 12 in a case in which a distance to move the electric fader, that is, a difference between the current position and the target position, is large.

Accordingly, the electric fader control portion 12 that has been set in the high speed movement mode supplies the drive information for driving the electric fader 2 with below-described base drive power to the drive portion 13.

The electric fader 2 driven with the base drive power moves at a high speed and reaches the target position. It is to be noted that the drive power to be set by the electric fader control portion 12 includes minimum drive power Pmin that is the lowest drive power capable of moving the electric fader 2, maximum drive power Pmax that is the highest drive power, the base drive power that is much higher than the minimum drive power Pmin and is lower than the maximum drive power Pmax, and silent drive power that is higher than the minimum drive power Pmin and is lower than the base drive power.

In addition, the fader position control portion 11, when generating a target position, sends data that indicates the silent movement mode to the electric fader control portion 12 in a case in which the distance to move the electric fader, that is, the difference between the current position and the target position is not large. Accordingly, the electric fader control portion 12 set in the silent movement mode supplies the drive information for driving the electric fader 2 with the silent drive power to the drive portion 13.

The electric fader 2 driven with the silent drive power moves silently, and reaches the target position. In this way, the electric fader drive unit 1, by switching the operation modes according to the length of the distance to move the electric fader between the current position and the target position, performs movement control in consideration of a balance between increase in speed and decrease in noise.

It is to be noted that, since the operation mode automatically switches according to the distance to move the electric fader from a current position to a target position, a user does not need to be conscious of the operation mode. It is preferable that the distance required for switching the operation modes should be about five mm to about 15 mm. In other words, a value from about five mm to about 15 mm is set to be a threshold value for switching the operation modes of the high speed movement mode and the silent movement mode. In addition, the operation modes are not switched during the movement of the electric fader 2.

Figure 2:
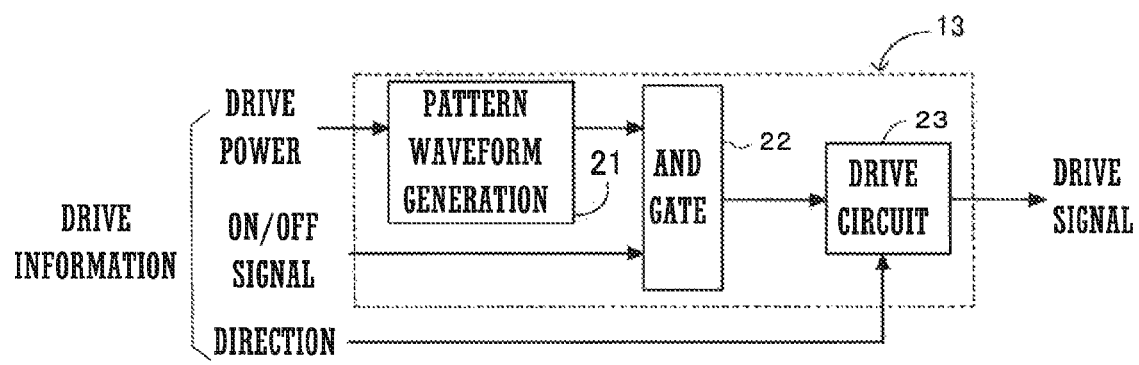
FIG. 2 is a functional block diagram showing a configuration of a drive portion.

FIG. 2 is a diagram showing a configuration of the drive portion 13. The drive portion 13 includes a pattern waveform generation portion 21, and an AND gate 22, and a drive circuit 23.

The pattern waveform generation portion 21 generates a pattern waveform corresponding to the drive information supplied from the electric fader control portion 12. The drive information includes data that indicates a direction in which the electric fader 2 is driven, data that indicates drive power, and an ON/OFF signal for driving. The pattern waveform generation portion 21 generates a drive signal that drives the motor according to the indicated drive power.

The pattern waveform generation portion 21 is a PWM (Pulse Width Modulation) circuit. The PWM circuit outputs as a drive signal a pulse waveform of a duty ratio corresponding to the data that indicates drive power. The PWM circuit is a circuit that changes a duty cycle of a predetermined pulse width (a ratio between H level and L level of the pulse width) according to the magnitude of the indicated drive power, at a predetermined cycle and drives the motor of the electric fader 2. While a pulse is ON (H level), a substantially the same voltage as a power supply voltage is applied to the motor. While the pulse is OFF (L level), no electric power is supplied to the motor. Therefore, while the pulse is off, the average electric power is decreased. In other words, the pattern waveform generation portion 21 controls energy supplied to the motor by performing PWM modulation of the pulse width.

The drive signal of a PWM waveform generated in the pattern waveform generation portion 21 is inputted into the first input portion of the AND gate 22. The ON/OFF signal for driving supplied from the electric fader control portion 12 is supplied to the second input portion of the AND gate 22. The electric fader control portion 12 generates an ON signal while the electric fader 2 is driven. The AND gate 22, while the ON signal is inputted, outputs the drive signal that the pattern waveform generation portion 21 has generated, and supplies the drive signal to the drive circuit 23. The drive circuit 23 is a circuit that outputs a drive signal of the electric power that drives the motor 102 of the electric fader 2. The drive circuit 23 changes the direction of current (voltage) according to the data that indicates the direction supplied from the electric fader control portion 12, and outputs a drive signal.

Subsequently, FIG. 3A is a view showing a drive signal D in the high speed movement mode. FIG. 3B is a view showing a position of the electric fader 2 in the high speed movement mode. It is to be noted that, while the drive signal D is generated by the drive portion 13, the drive signal D is assumed to be generated by the electric fader control portion 12 since the drive signal D is generated according to the drive information from the electric fader control portion 12.

The fader position control portion 11, when having generated a target position F1, specifies the high speed movement mode when the distance between the target position F1 and the current position Fc1 of the electric fader 2 is not less than a predetermined value. The fader position control portion 11, at time t0, supplies the generated target position F1 and the data that indicates the high speed movement mode, to the electric fader control portion 12.

The electric fader control portion 12 is set to be in the high speed movement mode. To begin with, the electric fader control portion 12 generates a drive signal D1 of "precharge" in which drive power increases gradually from the time t0 to time t1. The drive signal D1 increases in proportion to the lapse of time during a first predetermined time Tpre from the time t0 to the time t1. The drive power is, from the state of zero, maintained at the preparation drive power that is less than minimum drive power Pmin. The preparation drive power increases up to a preliminary prepared drive power Ppre. Accordingly, tension to such an extent that the electric fader 2 is not moved is applied mainly to the motor 102 of the electric fader 2. Thus, the electric fader drive unit 1, when thereafter applying the drive signal D not less than the minimum drive power Pmin to the electric fader 2, is capable of significantly reducing a noise that gives a bad influence on the surrounding environment.

It is to be noted that the first predetermined time Tpre for which the drive signal D1 of the "precharge" is applied is at least 10 ms. The first predetermined time Tpre may preferably be from 30 ms to 40 ms. In addition, the preliminary preparation drive power Ppre of the "precharge" may preferably be about 80% to 100% of the minimum drive power Pmin. It is to be noted that the preliminary preparation drive power Ppre, even if being set as about 30% to about 80% of the minimum drive power Pmin, may obtain some effect of making an operation sound silent.

The electric fader 2 includes various kinds of machine components provided with an "allowance" of space and the like. When the drive power is applied and the various kinds of machine components rapidly contact each other, a noise is generated. Moreover, the belt 106 has some bending. In a case in which the drive power is suddenly applied to the belt 106, the belt 106 expands and contracts, which generates a noise.

The electric fader drive unit 1 according to the present preferred embodiment performs the precharge so as to cause a large tension to be gradually imposed on the various kinds of the components of the electric fader 2. Therefore, the various kinds of the components of the electric fader 2 contact each other without generating a noise and a large tension is gradually imposed on the belt 106. In this way, since the electric fader 2 is driven after a certain amount of tension is imposed on the various kinds of the components, the electric fader 2 starts moving with a silent operation sound.

The precharge ends at the time t1. The electric fader control portion 12 shifts into a movement period if the time t1 passes. The electric fader control portion 12 generates a drive signal D2 of base drive power Pb at the time t1, and performs primary driving.

The drive power increases immediately from the preliminary preparation drive power Ppre to the base drive power Pb. In the present example, while the drive power increases step by step from the preliminary preparation drive power Ppre to the base drive power Pb, the drive power may increase, within an extremely short time, from the preliminary preparation drive power Ppre to the base drive power Pb.

If the drive power increases to the base drive power Pb, the electric fader 2 starts moving toward the target position F1. The position F of the electric fader 2 during movement is detected by the position detection portion 14, and is fed back to the electric fader control portion 12. Accordingly, the electric fader control portion 12 is capable of detecting the current position and the movement speed of the electric fader 2.

The electric fader control portion 12 performs control of slightly increasing or decreasing the base drive power Pb so that the movement speed of the electric fader 2 may become a predetermined target speed set in the high speed movement mode. Such control is performed in the above-stated feedback loop. As shown in FIG. 3A, the base drive power Pb is increased or decreased between Pb1 and Pb2 according to the current movement speed. Thus, the movement speed is controlled to be the target speed.

The electric fader control portion 12 decreases the drive power in a case in which the calculated difference (distance) between the current position and the target position F1 is not more than a predetermined distance L1. In the present example, the calculated difference (distance) between the current position and the target position F1 is not more than the predetermined distance L1 at time t2. Therefore, the electric fader control portion 12, from the time t2 to time t3, generates a drive signal D3 for decreasing the drive power from the base drive power Pb to zero.

At this time, the electric fader 2 receives a braking force caused by a frictional force, which decreases the movement speed of the electric fader 2. Then, the electric fader 2, as shown in FIG. 3B, reaches the target position F1 at the time t3 and stops. It is to be noted that the distance L1 may preferably be about 10 mm to about 20 mm. The distance L1 may preferably be short when the electric fader 2 is relatively heavy and may preferably be long when the electric fader 2 is light.

It is to be noted that, in a case in which the electric fader 2 overshoots the target position F1, the electric fader control portion 12 performs the control of moving the electric fader 2 in the opposite direction. However, if the drive power in the opposite direction is too large, the electric fader 2 may overshoot in the opposite direction again. In such a case, the electric fader 2 vibrates and generates an unusual sound. Thus, it is preferable that the upper limit value of the number of retry times should be determined.

Subsequently, FIG. 4A is a view showing a drive signal D in the silent movement mode. FIG. 4B is a view showing a position of the electric fader 2 in the silent movement mode. It is to be noted that, while the drive signal D is generated by the drive portion 13, the drive signal D is assumed to be generated by the electric fader control portion 12 since the drive signal D is generated according to the drive information from the electric fader control portion 12.

The fader position control portion 11, when having generated a target position F2, specifies the silent movement mode when the distance between the target position F2 and the current position Fc2 of the electric fader 2 is less than a predetermined value. The fader position control portion 11, at the time t0, supplies the generated target position F2 and the data that indicates the silent movement mode, to the electric fader control portion 12.

The electric fader control portion 12 is set to be in the silent movement mode. The electric fader control portion 12 generates the drive signal D1 of the above-stated precharge from the time t0 to time t11.

The precharge ends at the time t11. The electric fader control portion 12 shifts to a movement period if the time t11 passes. The electric fader control portion 12 generates a drive signal D12 of silent drive power Ps lower than the base drive power Pb at the time t11, and performs primary driving. The drive power increases immediately from the preliminary preparation drive power Ppre to the silent drive power Ps. In the present example, while the drive power increases step by step from the preliminary preparation drive power Ppre to the silent drive power Ps, the drive power may increase, within an extremely short time, from the preliminary preparation drive power Ppre to the silent drive power Ps.

The electric fader control portion 12 performs control of slightly increasing or decreasing the silent drive power Ps so that the movement speed of the electric fader 2 may become a predetermined target speed set in the silent movement mode. This control is performed in the above-mentioned feedback loop. As shown in FIG. 4A, the silent drive power Ps is increased or decreased between Ps1 and Ps2 according to the current movement speed. Accordingly, the movement speed is controlled to be the target speed.

The electric fader control portion 12 decreases the drive power when the calculated difference (distance) between the current position and the target position F2 is not more than a predetermined distance L2. In the present example, at time t12, the calculated difference (distance) between the current position and the target position F2 is not more than the predetermined distance L2. Therefore, the electric fader control portion 12, from the time t12 to time t13, generates a drive signal D13 for decreasing the drive power from the silent drive power Ps to the preparation drive power. In the present example, the preparation drive power is set as post preparation drive power Ppos that has a value lower than the preliminary preparation drive power Ppre. However, the post preparation drive power Ppos may have a value higher than the preliminary preparation drive power Ppre or may have the same value as the preliminary preparation drive power Ppre. The decrease in the drive power of the drive signal D13 is more gradual than the decrease in the drive power of the drive signal D3.

At this time, the electric fader 2 receives a braking force caused by a frictional force, which decreases the movement speed of the electric fader 2. Then, the electric fader 2, as shown in FIG. 4B, reaches the target position F2 at the time t13 and stops. It is to be noted that the distance L2 may preferably be about 10 mm to about 20 mm. The distance L2 may preferably be short when the electric fader 2 is relatively heavy and may preferably be long when the electric fader 2 is light.

The electric fader control portion 12, even after the time t13 passes, generates a drive signal D14 so that the drive power may be maintained at the post preparation drive power Ppos. The drive signal D14 is referred to as "drive signal of postcharge". The "postcharge" refers to a state in which, after the primary driving in which the electric fader 2 is moved to a target position, the post preparation drive power Ppos lower than the minimum drive power Pmin is continuously applied to the drive portion of the electric fader 2 over a second predetermined time Tpost and the tension lower than the minimum drive power is continuously imposed on the drive portion of the electric fader 2.

Accordingly, after the primary driving, tension to such an extent that the electric fader 2 is not moved is continuously applied to the electric fader 2. Therefore, an operation sound can be made silent also when the following primary driving is performed.

It is to be noted that the electric fader control portion 12, in a case in which the following primary driving is not performed within the second predetermined time Tpost, stops the postcharge at a time when the second predetermined period Tpost elapses (at time t15). The electric fader control portion 12, in a case in which a following target value and a following operation mode are indicated at time t14 before reaching the time t15, at the time t14, generates a drive signal D1' having the same inclination (proportionality coefficient) as the drive signal D1 until the drive power reaches the preliminary preparation drive power Ppre. In addition, the electric fader control portion 12 generates a drive signal of the primary driving corresponding to the indicated operation mode after the drive power reaches the preliminary preparation drive power Ppre.

It is to be noted that the second predetermined time Tpost in which the drive signal D14 of the postcharge is applied may preferably be from several 10 ms to several 100 ms. The several 10 ms to the several 100 ms may be from 20 ms to 300 ms, for example. The second predetermined time Tpost may preferably be about 50 ms. If the second predetermined time Tpost is too long, it will become difficult for a user to operate the electric fader 2 manually.

Moreover, the electric fader control portion 12 may stop the postcharge when detecting a user touch on the electric fader 2. The electric fader drive unit 1 is capable of detecting the user touch on the electric fader 2, by including the electric fader 2 provided with a touch sensor.

It is preferable that the post preparation drive power Ppos should be about 30% to 50% of the minimum drive power Pmin. The post preparation drive power Ppos, even if being about 50% to 100% of the minimum drive power Pmin, has an effect of making an operation sound silent. However, the accuracy of making a stop at a target position is increased in a case in which the post preparation drive power Ppos is about 30% to about 50% of the minimum drive power Pmin. Furthermore, the electric fader control portion 12, in a case in which a movement direction in the following primary driving is opposed to the movement direction in the previous primary driving, may preferably end the postcharge and newly perform the precharge. In other words, in a case in which the fader position control portion 11 indicates a target position in order of a first target position, a second target position, and a third target position, the electric fader control portion 12, when a direction from the second target position to the third target position is opposite to a direction from the first target position to the second target position, changes the drive power to a predetermined drive power after the electric fader 2 moves to the second target position, and performs the precharge.

As described above, in the high speed movement mode, the electric fader 2 is moved at a high speed and is rapidly decelerated. In the silent movement mode, the electric fader 2 is moved at a low speed, and the drive power is gradually decelerated. For example, in a case in which scene recall is performed, the distance between the current position of the electric fader 2 and a target position set in a recalled scene becomes large in many cases. Therefore, in the case in which scene recall is performed, the high speed movement mode is indicated in many cases.

The CPU 15 controls the operations of the fader position control portion 11 and the electric fader control portion 12 in the high speed movement mode and the silent movement mode. The electric fader drive unit 1 makes an operation sound silent by performing the precharge at a time when the electric fader 2 starts driving in the high speed movement mode or the silent movement mode. The initial value of the precharge is not limited to zero. The electric fader drive unit 1 is particularly capable of making an operation sound silent by performing the postcharge in the silent movement mode. It is to be noted that the postcharge does not need to be performed in the high speed movement mode.

The effects of performing the postcharge in the silent movement mode are as follows.

For example, when performing fade-in or fade-out processing, the electric fader 2 moves to a target position gradually for time longer than usual. Generally, the electric fader 2 has the maximum stroke of about 80 mm to 100 mm. The electric fader 2, if driven with the minimum drive power, moves about 100 mm in about several seconds. Therefore, for example, the electric fader drive unit 1 drives the electric fader 2 intermittently when moving the electric fader 2 from a current position to a target position for 30 seconds. In other words, the fader position control portion 11 sets a plurality of target positions (such as the first target position, the second target position, and the third target position) before a final target position, and supplies the electric fader control portion 12 with data that sequentially indicates the plurality of target positions (such as the first target position, the second target position, and the third target position) at every predetermined timing. Such intermittent driving enables the electric fader 2 to move to the final target position, for example, for 30 seconds. Since the distance between two adjacent target positions (the first target position and the second target position, for example) is short, the operation mode changes into the silent movement mode. The postcharge is performed when the electric fader 2 moves to a certain target position (the first target position, for example) and then moves to the next target position (the second target position, for example). The postcharge is repeatedly performed until the electric fader 2 moves to the final target position. Therefore, in the silent movement mode, the effect of the postcharge is particularly high.

It is to be noted that the postcharge does not need to be performed in all the plurality of target positions when the intermittent drive is performed. For example, the postcharge may be performed only in a period when a predetermined flag is set.

Figure 5:
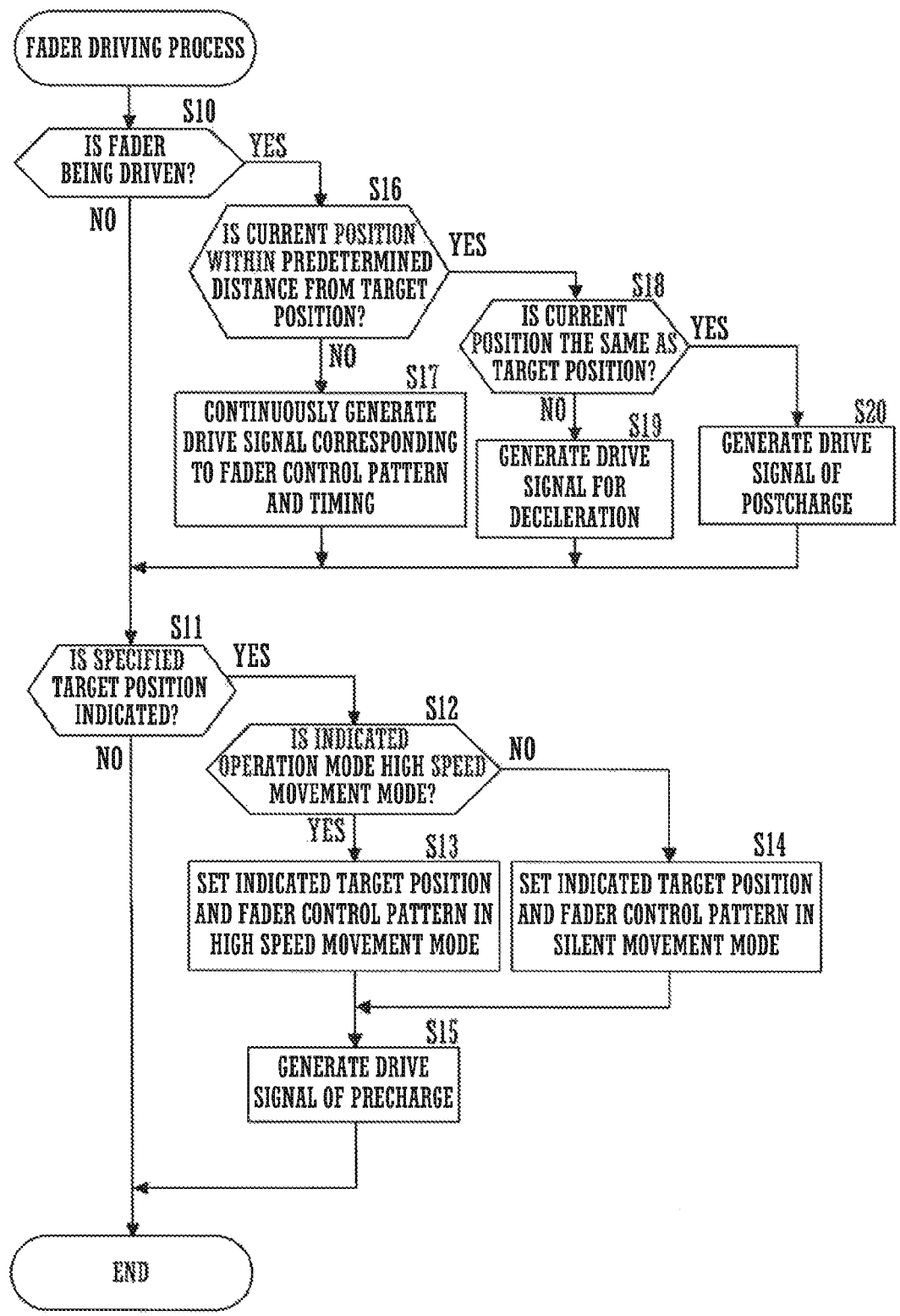
FIG. 5 is a flow chart showing an operation of the electric fader drive unit.

FIG. 5 is a flow chart of a fader driving process in the electric fader drive unit 1. In a case in which the electric fader drive unit 1 is included in the digital mixer, the CPU 15 mounted in the digital mixer performs the fader driving process shown in FIG. 5.

The fader driving process shown in FIG. 5 is performed at every predetermined timing while the power supply of the digital mixer is on. If the fader driving process is started, the CPU 15 determines whether or not the electric fader 2 is being driven in Step S10. When determining that the electric fader 2 is not being driven (No in S10), the CPU 15 proceeds to Step S11 and determines whether or not the data that specifies a target position is indicated from the fader position control portion 11 to the electric fader control portion 12. When determining that the data that specifies a target position is not indicated (NO in S11), the CPU 15 ends the fader driving process.

When determining that the data that specifies a target position is indicated (YES in S11), the CPU 15 proceeds to Step S12 and determines whether or not the indicated operation mode is the high speed movement mode. When determining that the data that indicates the high speed movement mode is sent from the fader position control portion 11 to the electric fader control portion 12 (YES in S12), the CPU 15 sets the indicated target position and high speed movement mode and then sets the fader control pattern of the high speed movement mode shown in FIGS. 3A and 3B (Step S13).

When determining that the data that indicates the silent movement mode is sent from the fader position control portion 11 to the electric fader control portion 12 (NO in S12), the CPU 15 sets the indicated target position and silent movement mode to the electric fader control portion 12 and then sets the fader control pattern of the silent movement mode shown in FIGS. 4A and 4B (Step S14).

If the fader control pattern is set to the electric fader control portion 12, the electric fader 2 starts being driven. Therefore, in Step S15, even when the set operation mode is either the high speed movement mode or the silent movement mode, the drive signal D1 of the precharge is generated to perform the precharge. After the processing in Step S15 ends, the fader driving process ends.

If a next interrupt occurs and the fader driving process restarts, the CPU 15 determines whether or not the electric fader 2 is being driven in Step S10. When determining that the electric fader 2 is being driven (YES in S10), the CPU 15 proceeds to Step S16 and determines whether or not the current position of the electric fader 2 is within a predetermined distance from the specified target position.

The electric fader control portion 12 calculates the difference between the target position indicated from the fader position control portion 11 and the current position of the electric fader 2 notified from the position detection portion 14. The CPU 15 determines whether or not the calculated difference is not more than a predetermined value (S16). The CPU 15, when set in the high speed movement mode, determines whether or not the calculated difference is within the distance L1, and, when set in the silent movement mode, determines whether or not the calculated difference is within the distance L2.

When determining that the calculated difference is more than the predetermined value (NO in S16), the CPU 15 proceeds to Step S17 and continuously sends a drive signal corresponding to the current fader control pattern and each timing, to the electric fader control portion 12. In other words, the electric fader control portion 12 continuously generates the drive signal D1 of the precharge if the current time is in a precharge period, and continuously generates the drive signal D of the primary driving if the current time is after the precharge period.

In addition, when determining that the calculated difference is not more than the predetermined value (YES in S16), the CPU 15 proceeds to Step S18 and determines whether or not the current position is the same as the specified target position. Again in this case, the electric fader control portion 12 calculates the difference between the target position indicated from the fader position control portion 11 and the current position of the electric fader 2 notified from the position detection portion 14. The CPU 15 determines that the current position of the electric fader 2 is the same as the target position, when the calculated difference is extremely small. When determining that the current position of the electric fader 2 is not the same as the target position (NO in S18), the CPU 15 proceeds to Step S19. In Step S19, the CPU 15 determines that the current fader position of the electric fader 2 has not reached but is close to the target position because the remaining distance is short, and generates the drive signal (D3 or D13) for decelerating the electric fader 2, to the electric fader control portion 12 (S19).

When determining that the current position of the electric fader 2 is the same as the target position (YES in S18), the CPU 15 proceeds to Step S20 and generates the drive signal D14 of the postcharge to the electric fader control portion 12 to perform the postcharge. It is to be noted that, when the high speed movement mode is set, the processing of Step S20 is not essential and may be skipped.

After the processing of either Step S17, Step S19 or Step S20 ends, the CPU 15 proceeds to Step S11. However, in the case in which the electric fader 2 is being driven, the CPU 15 ends the fader driving process since the data that specifies a target position is not indicated.

The above fader driving process is repeatedly performed at every predetermined timing. Accordingly, the electric fader 2 is moved to the indicated target position in the indicated operation mode.

The electric fader drive unit 1 can be achieved by the hardware configuration shown in FIG. 1 and FIG. 2. However, the electric fader drive unit 1 can also be achieved by executing a program of the above-stated fader driving process in a computer. The computer is realized by a personal computer (PC) provided with at least a CPU, a ROM (Read Only Memory) that mainly stores a program, and a RAM (Random Access Memory) as a main memory. The digital mixer controlled by the computer is provided with a control portion that includes at least the same configuration as the PC. Therefore, in a case in which the digital mixer is provided with the electric fader 2 and the electric fader drive unit 1, the control portion of the digital mixer executes the program of the fader driving process.

A digital mixer provided with the electric fader drive unit is also capable of driving the electric fader with a MIDI signal inputted from an external device (a personal computer, for example). In such a case, a user can operate the position of the electric fader in real time. Furthermore, the digital mixer is also capable of driving the electric fader at a predetermined timing specified in the event data, by inputting event data for moving the electric fader from the external device.

In addition, a light dimmer provided with the electric fader drive unit is also capable of achieving the function of the electric fader drive unit described in the present preferred embodiment. The light dimmer is capable of more effectively controlling the brightness of the lighting used for a stage or a studio according to the purpose of use (a scene).

While the drive signal D1 changes the drive power in proportion to the lapse of time and the drive signal D3 or the drive signal D13 changes the drive power in inverse proportion to the lapse of time, the drive power may be nonlinearly changed like a quadratic function, for example.

Moreover, the drive power may be changed in a stepwise manner. However, it is preferable that each step should be as small as possible.

In the silent movement mode, in a case in which the difference between the current position and the target position is short (within the distance L2, for example), the drive power becomes lower than the silent drive power Ps. If the electric fader is heavy, the electric fader may not move even if the drive power lower than the silent drive power Ps is applied to the electric fader. Therefore, in the silent movement mode, the electric fader drive unit may temporarily apply a large drive power (the silent drive power Ps, for example) to the electric fader until the electric fader is moved about several mm.

While the example shows that the electric fader drive unit is driven by the PWM circuit in which the application of a constant voltage is turned on and off, the voltage does not need to be fixed.

In addition, while the present preferred embodiment shows an example in which the electric fader is moved in a straight line, the electric fader may be applied to a rotating operating portion.

Moreover, while the present preferred embodiment shows an example in which the operation mode is automatically switched according to the distance between the current position and the target position, a user may be able to choose an operation mode.

Furthermore, while the present preferred embodiment shows two operation modes of the high speed movement mode and the silent movement mode, the electric fader drive unit 1 may include an intermediate mode that is faster than the silent movement mode and quieter than the high speed movement mode.

The preliminary preparation drive power Ppre of the precharge, the post preparation drive power Ppos of the postcharge, the distance L1, and the distance L2 each have a different optimal value, depending on the type of an electric fader or the individual difference in the electric fader. Therefore, it is preferable that the preliminary preparation drive power Ppre of the precharge, the post preparation drive power Ppos of the postcharge, the distance L1, and the distance L2 should be adjusted to an optimal value beforehand by measurement.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric fader drive unit comprising:
   a drive portion that drives an electric fader by supplying drive power to the electric fader;
   a fader position control portion that indicates a target position of the electric fader; and
   an electric fader control portion that receives an indication of the target position from the fader position control portion, and, when controlling the drive portion to move the electric fader to the target position, moves the electric fader to the target position by changing the drive power from a preparation drive power less than a minimum drive power that is a lowest drive power required for moving the electric fader to a predetermined drive power not less than the minimum drive power, and
   wherein the electric fader control portion further increases the drive power from 0 to the preparation drive power over a first predetermined time, and changes the drive power from the preparation drive power to the predetermined drive power after the first predetermined time elapses, so as to move the electric fader to the target position.

2. The electric fader drive unit according to claim 1, wherein the electric fader control portion changes the drive power from the preparation drive power to the predetermined drive power after the first predetermined time elapses, moves the electric fader to the target position, and then changes the drive power from the predetermined drive power to the preparation drive power and maintains the drive power at the preparation drive power until a second predetermined time elapses.

3. The electric fader drive unit according to claim 1, wherein the first predetermined time is equal to or longer than 10 ms.

4. The electric fader drive unit according to claim 2, wherein the second predetermined time is from 20 ms to 300 ms.

5. The electric fader drive unit according to claim 1, wherein the electric fader control portion increases the drive power in proportion to a lapse of time when increasing the drive power to the preparation drive power over the first predetermined time.

6. The electric fader drive unit according to claim 1, wherein the electric fader control portion increases an amount of increase in the drive power with a lapse of time when increasing the drive power to the preparation drive power over the first predetermined time.

7. The electric fader drive unit according to claim 1, wherein the electric fader control portion immediately increases the drive power from the preparation drive power to the predetermined drive power after the first predetermined time elapses.

8. The electric fader drive unit according to claim 2, wherein the electric fader control portion, while maintaining the drive power at the preparation drive power, immediately increases the drive power from the preparation drive power to the predetermined drive power when receiving an indication of a new target position from the fader position control portion.

9. The electric fader drive unit according to claim 2, wherein:
   the fader position control portion indicates a plurality of target positions; and
   the electric fader control portion does not apply the preparation drive power after the electric fader reaches a final target position among the plurality of target positions indicated by the fader position control portion.

10. The electric fader drive unit according to claim 1, wherein:
    the target position includes a first target position, a second target position, and a third target position;
    the fader position control portion indicates the target position in the order of the first target position, the second target position, and the third target position; and
    the electric fader control portion changes the drive power from 0 to the preparation drive power after the electric fader is moved to the second target position in a case in which a direction from the second target position to the third target position is opposite to a direction from the first target position to the second target position.

11. A fader device comprising:
    the electric fader drive unit according to claim 1,
    a fader;
    a motor that rotates by the drive power; and
    a belt that moves the fader in accordance with rotation of the motor.

12. An audio mixer comprising the fader device according to claim 11.

13. An electric fader driving method comprising:
    receiving an indication of a target position of an electric fader;
    increasing a drive power from 0 to a preparation drive power over a first predetermined time, wherein the preparation drive power is less than a minimum drive power that is a lowest drive power required for moving the electric fader; and
    moving the electric fader to the target position by changing the drive power of the electric fader from the preparation drive power to a predetermined drive power not less than the minimum drive power after the first predetermined time elapses.

* * * * *